Feb. 8, 1927. 1,616,603
V. WILLOUGHBY
COUPLER CENTERING DEVICE
Filed Nov. 12, 1923  6 Sheets-Sheet 1

INVENTOR
Victor Willoughby
BY F. H. Gibbs
ATTORNEY.

Feb. 8, 1927. 1,616,603
V. WILLOUGHBY
COUPLER CENTERING DEVICE
Filed Nov. 12, 1923   6 Sheets-Sheet 2

INVENTOR
Victor Willoughby
BY F. H. Gibbs
ATTORNEY

Feb. 8, 1927.  
V. WILLOUGHBY  
1,616,603  
COUPLER CENTERING DEVICE  
Filed Nov. 12, 1923   6 Sheets-Sheet 6

INVENTOR  
Victor Willoughby  
BY F. H. Gibbs  
ATTORNEY

Patented Feb. 8, 1927.

1,616,603

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

COUPLER-CENTERING DEVICE.

Application filed November 12, 1923. Serial No. 674,233.

It is an object of this invention to provide an improved centering device for car couplers. It is also an object of this invention to provide an improved device of the type described which will permit of a limited movement of the coupler without a corresponding movement of the train pipes, and which will provide for a simultaneous movement of the train pipes with the coupler when the movement of the coupler exceeds a predetermined amount.

Figure 1:
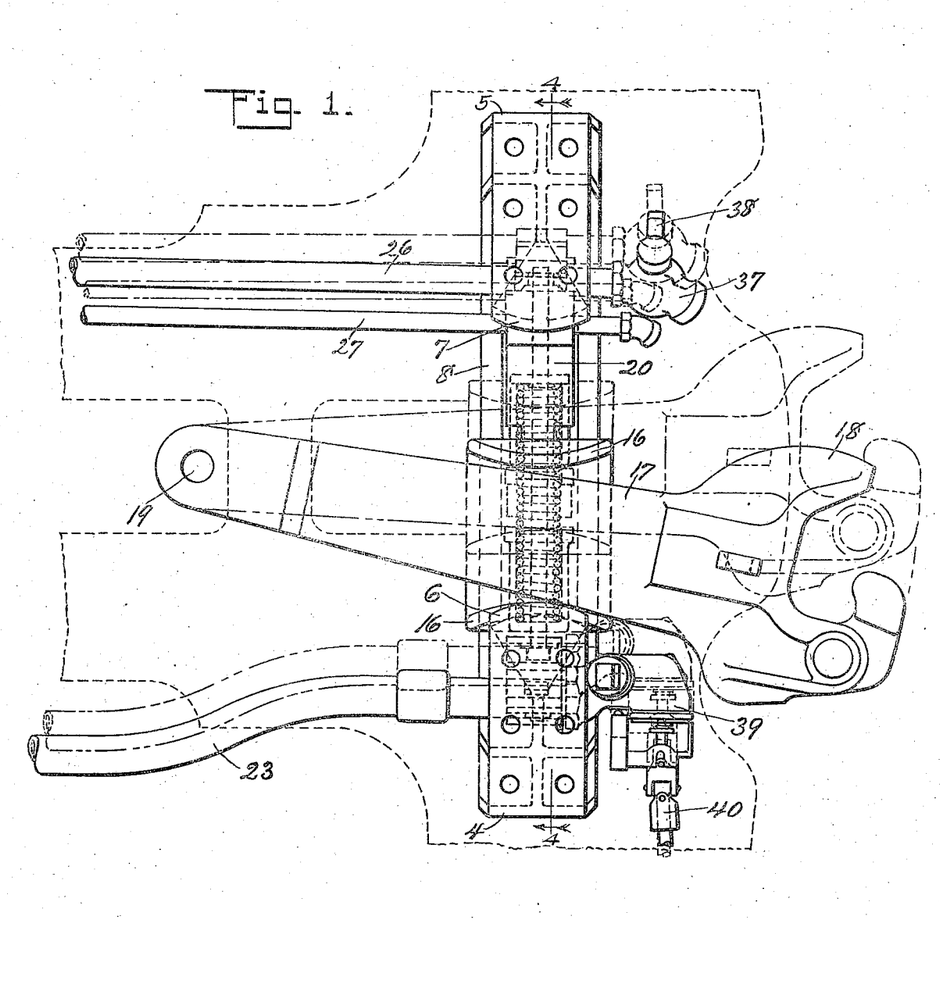
Fig. 1 is a top plan view of a coupler centering device constructed in accordance with this invention, a portion of the car platform frame being indicated by broken lines and the coupler being shown at its limit of movement in one direction in full lines and its centered position being indicated by broken lines.

With these and other objects in view the invention as shown in Figs. 1 to 7, inclusive, comprises a carry iron 1 secured to the end sill 2 of the platform frame 3. The carry iron 1 comprises a casting having spaced side members 4 and 5 provided with inwardly projecting flanges 6 and 7 by means of which the casting is secured to the end sill 2 by bolts, not shown, or other suitable securing means. The spaced members 4 and 5 are connected by a crosspiece 8 composed of spaced substantially channel shaped sections 9 and 10 having outwardly projecting flanges and joined by spacing and reinforcing walls 11 and 12. The upper edges of the channel shaped sections 9 and 10 are raised at their centers for a portion of their length and have slidably mounted thereon a saddle casting 13 which is provided with spaced supporting portions 14 which rest on the upper flanges of the sections 9 and 10 and are provided with downwardly projecting flanges 15 which serve to guide the saddle casting on the crosspiece 8. The saddle casting 13 is also provided with upwardly projecting flanges 16 forming shoulders between which the shank 17 of the coupler 18 engages, the flanges 16 being curved, as shown in Fig. 1, to provide a proper engaging surface for the coupler shank 17 as the coupler is swung about the point 19 where it is pivotally secured by any suitable means (not shown). Resting upon short inwardly projecting flanges 9' and 10' on the sections 9 and 10 of the crosspiece 8 is a pipe support 20 having a central portion adapted to pass beneath the saddle casting 13 and between the raised portions of the upper edges of the channel sections 9 and 10. The pipe support 20 has its ends bent to form the upwardly projecting portions 21 and 22, the portion 21 having a train steam pipe 23 secured thereto by a clip 24 and bolt 25 while the portion 22 has secured thereto a train brake pipe 26 and a train signal pipe 27 by a clip 28 and a bolt 29, the pipe support 20 being the outer support of the pipes which are also supported by clips not shown which secure the pipes to the car frame at a sufficient distance from the end sill to allow of the ends of the pipe being moved the desired distance across the carry iron without causing a rupture of the pipes or necessitating a swivel joint in the pipe length. Mounted in openings in the spacing walls 11 and 12 is a bolt 32 having mounted thereon spring followers 33 and 34 and a spring 43 which is confined between the walls 11 and 12 under an initial compression. The spring followers 33 and 34 are provided with spaced upwardly projecting fingers 35, 35' and 36, 36', respectively, which project upwardly through notches or openings 20' in the pipe support 20 and engage with the walls of the saddle casting 13, it being noted that in the normal position of the parts with the coupler shank centered the spring followers 33 and 34 engage the walls 11 and 12, respectively, and the fingers 35, 35' and 36, 36' are in engagement with the walls of the saddle casting and with the outer edges of the openings in the pipe support 20 through which they project. As shown in the drawings, the train pipe 26 is provided with the usual angle cock 37 having a handle 38 while the steam pipe 23 is provided with a valve 39 operated by a valve operating mechanism 40 slidably secured by a bracket not shown to the end sill 2 of the car platform frame.

Figure 2:
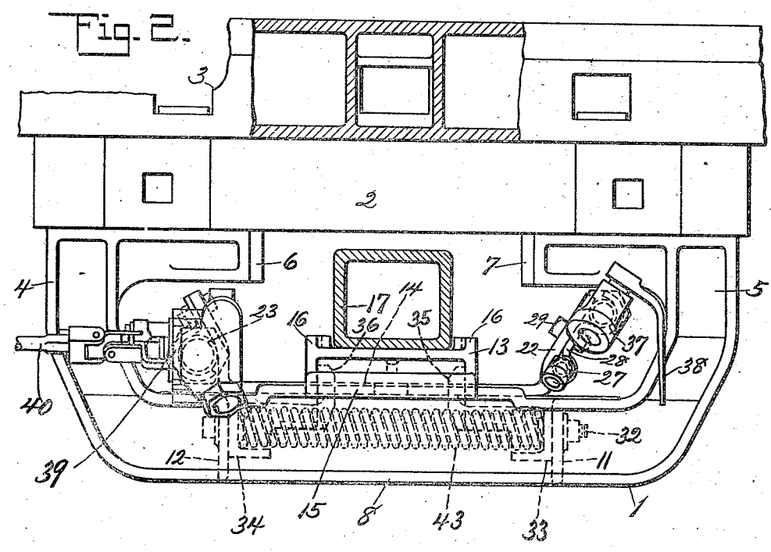
Fig. 2 is a vertical section taken through the coupler when in its normal centered position and showing the centering device in elevation.
Figure 3:
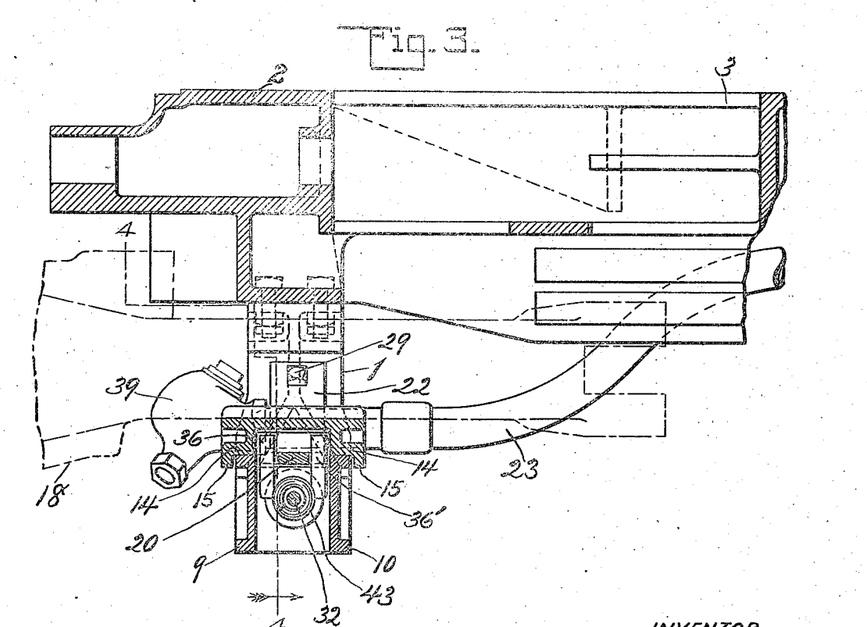
Fig. 3 is a vertical section taken longitudinally through the structure shown in Fig. 1.
Figure 4:
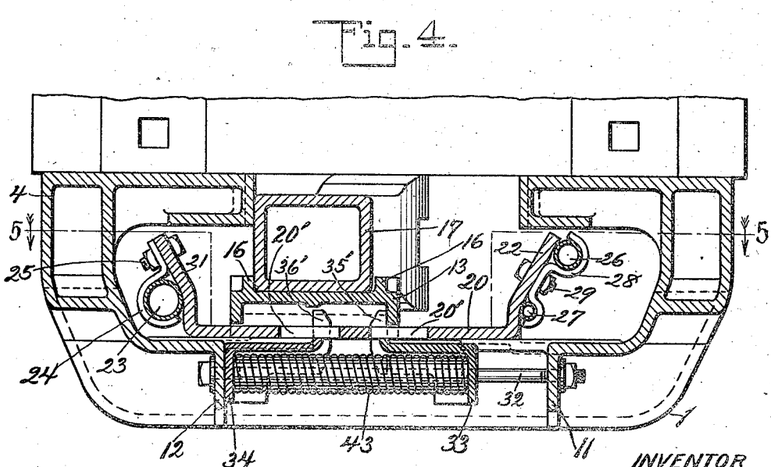
Fig. 4 is a vertical section taken on the lines 4—4 of Figs. 1 and 3.
Figure 5:
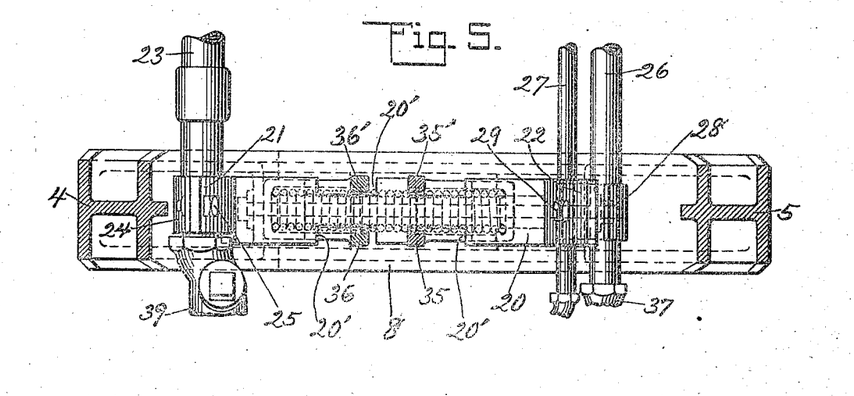
Fig. 5 is a horizontal section taken on the line 5—5 of Fig. 4.

In the operation of this device it will be noted that any movement of the coupler 18 to either side of its normal or central position will cause the saddle casting 13 to travel along the channel sections 9 and 10 and through its engagement with the projecting finger portions 35, 35' and 36, 36' of the spring followers 33 and 34, respectively, will cause one of the spring followers to travel along the rod 32 compressing the spring 43, the opposite end of the spring and the other spring follower being held against movement by engagement with the adjacent spacing wall 11 or 12. As the fingers 35, 35' or 36, 36' are moved they will travel in the openings 20' in the pipe support 20 for a predetermined distance before engaging the opposite side of the openings, a construction which will permit of a predetermined transverse or lateral movement of the coupler 18 without a corresponding movement of the pipe support 20 and the train pipes 23, 26, and 27. Any further movement of the coupler 18 after the projecting fingers 35, 35' or 36, 36' are in engagement with the inner edges of the openings in the pipe support 20 will cause the pipe support 20 and the train pipes to move simultaneously with the coupler 18, this movement continuing until the coupler 18 engages with the end of one of the flanges 6 or 7 of the carry iron 1 which serve as stops limiting the movement of the coupler. If pressure on the coupler 18 is released, the spring 43, acting through the engagement of the projecting fingers 35, 35' or 36, 36' with the wall of the casting 13, will return the coupler 18 to its normal or central position, the projecting fingers traveling in openings 20' in the pipe support 20 until the fingers engage with the outer edges of the openings, whereupon the pipe support 20 will be moved simultaneously with the coupler 18 until the parts are returned to their normal position, as shown in Fig. 2, with the spring followers 33 and 34 in engagement with the walls 11 and 12, respectively, and the fingers 35, 35' and 36, 36' in engagement with the outer edges of the openings 20' in the pipe support 20 and with the walls of the channel casting 13.

Figures 6, 7, 8, 9:
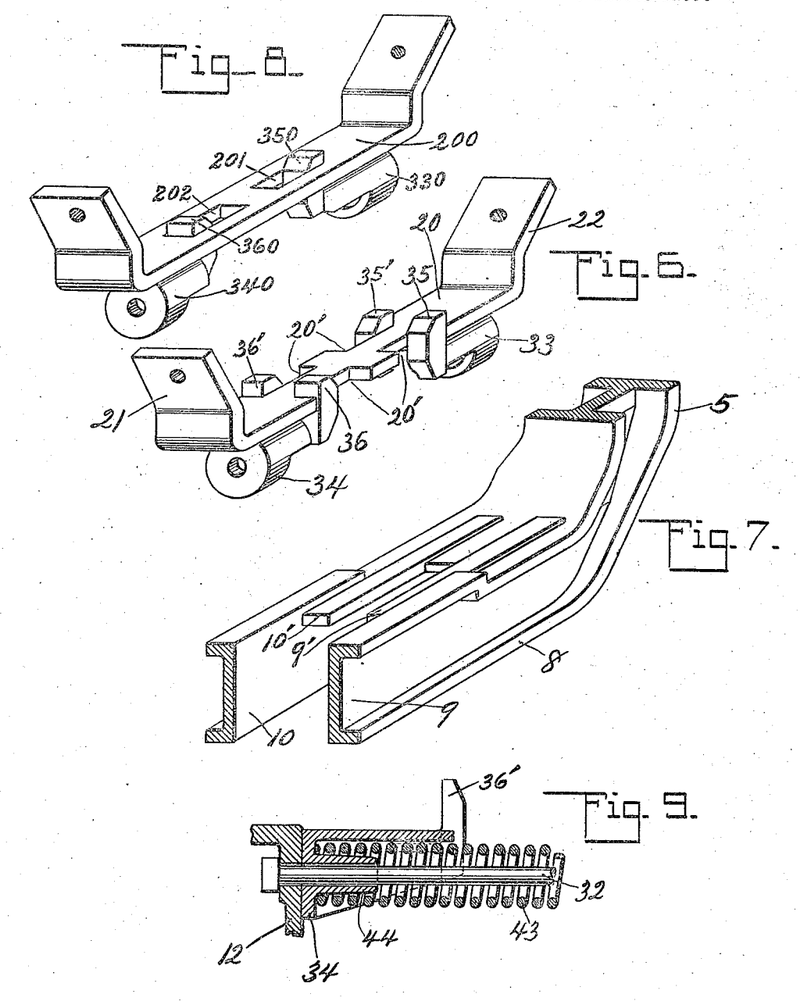
Fig. 6 is a perspective view of the pipe support and spring followers shown detached from the rest of the structure.
Fig. 7 is a perspective view of a portion of the carry iron.
Fig. 8 is a perspective view showing a modified form of pipe support and spring followers.
Fig. 9 is a fragmentary vertical section showing a spring follower of modified design.
Figure 10:
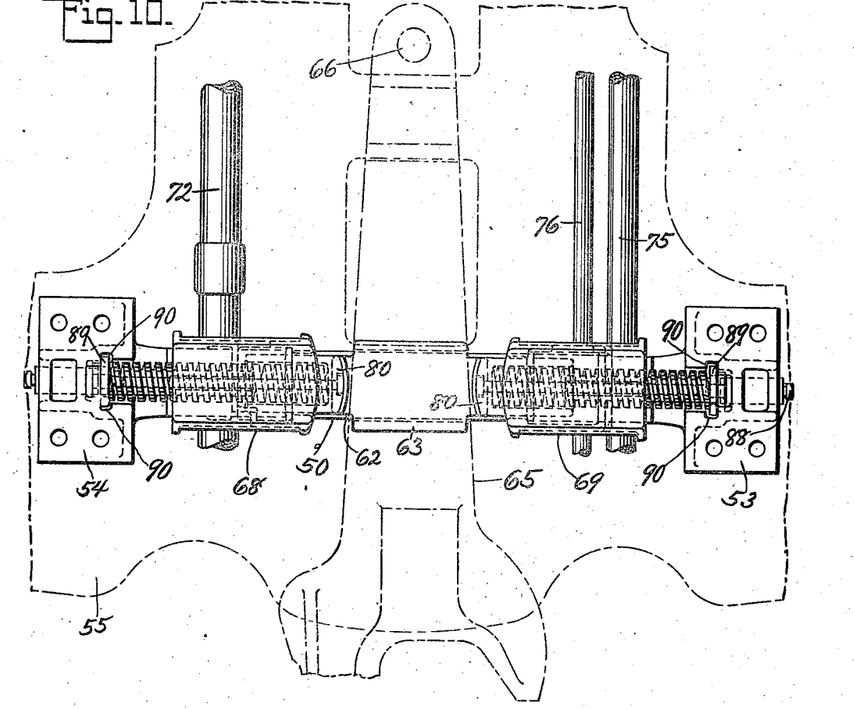
Fig. 10 is a top plan view of a coupler centering device of modified construction.
Figure 11:
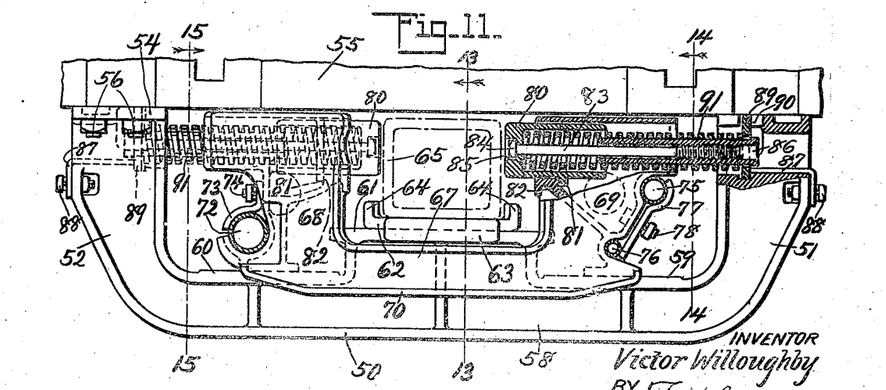
Fig. 11 is a view partly in front elevation and partly in section of the centering device shown in Fig. 10, the coupler shank being indicated by broken lines.
Figure 12:
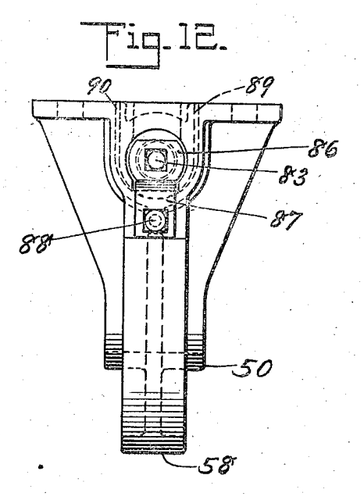
Fig. 12 is an end elevation of the centering device shown in Figs. 10 and 11, the platform frame and coupler being omitted.
Figure 13:
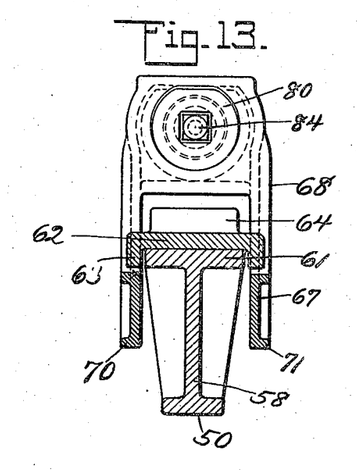
Figs. 13, 14 and 15 are vertical sections taken on the lines 13—13, 14—14, and 15—15, respectively, of Fig. 11, the platform frame and coupler being omitted.
Figure 14:
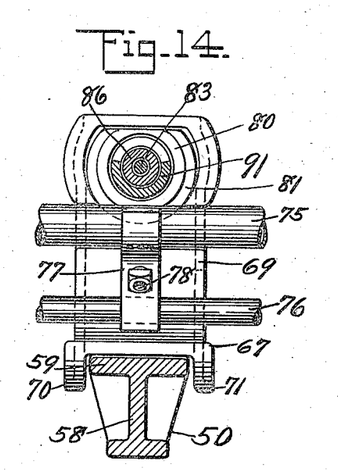
Figure 15:
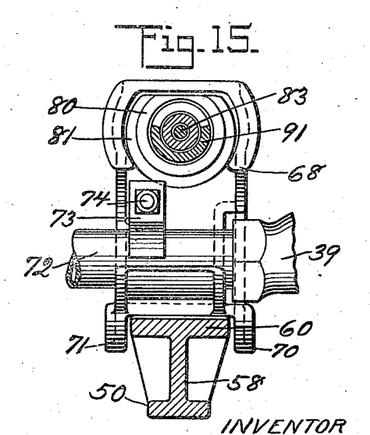

In the modified construction of pipe support and spring followers shown in Fig. 8, the pipe support 200 is provided with spaced slots 201 and 202 on its central longitudinal axis in which are engaged the upwardly projecting fingers 350 and 360 on the spring followers 330 and 340 respectively. The construction of Fig. 8 provides for a single projecting finger on each spring follower while the construction of the Fig. 6 provides for a pair of projecting fingers on each spring follower. The modified elements shown in Fig. 8 are assembled with the other elements of the centering device in the same manner as are the elements shown in Fig. 6 and operate in the same manner.

In the modified design of spring follower shown in Fig. 9, the spring follower is provided with a sleeve 44 formed integral therewith and which receives the rod 32 and projects into the coils of the spring 43, this serving to keep the spring 43 properly positioned and aiding in guiding the spring follower.

In the modified construction shown in Figs. 10 to 15, inclusive, the carry iron 50 comprises a casting having spaced side members 51 and 52 having flanges 53 and 54, respectively, by means of which the carry iron is secured to platform end sill 55 by bolts 56. The spaced side members 51 and 52 are connected by a crosspiece 58 of substantially I-shape and having an upper flange of greater width than the lower flange providing bearing surfaces 59, 60 and 61. The bearing surface 61 at the center of the crosspiece 58 is raised above the bearing surfaces 59 and 60 at the sides and supports a saddle casting 62 provided with downwardly projecting flanges 63 which guide it on the bearing surface 61. The saddle casting 62 is also provided with curved upwardly projecting flanges 64 which serve as shoulders for engaging with the shank of the coupler 65 which rests upon the saddle casting 62 and is pivoted, as at 66.

Slidably mounted upon the bearing surfaces 59 and 60 is a pipe support 67 comprising spaced bracket arms 68 and 69 connected by spaced connecting members 70 and 71 lying on the opposite sides of the raised portion of the crosspiece 58 and having their ends form guide flanges which guide the pipe support 67 on the bearing surfaces 59 and 60. To the bracket arm 68 the train pipe 72 is secured by a clip 73 and bolt 74 while to the bracket arm 69 the train brake pipe 75 and the train signal pipe 76 are secured to a clip 77 and bolt 78. Both of the bracket arms 68 and 69 are provided at their upper ends with cylindrical openings in which are mounted plungers 80 provided with collars 81 which engage with shoulders 82 formed in the bracket arms and limit the outward movement of the plungers. Each plunger 80 is provided with an opening to receive a bolt 83 which projects through the plunger and the opening in the bracket arm and extends into an opening formed in the adjacent one of the spaced members 51 and 52 of the carry iron 50. At its outer end the bolt 83 is prevented from turning by the engagement of its squared head 84 in a correspondingly shaped opening 85 in the plunger 80 while at its other end it is threaded to receive an adjusting nut 86 which is prevented from turning from its adjusted position by the engagement of the squared portion of the adjusting nut with a nut lock 87 held in place by a bolt 88. Surrounding the bolt 83 and confined between the plunger 80 and a washer 89 which engages in a slot 90 in each of the spaced members 51 and 52 is a spring 91 which is confined under initial compression and tends to force the plungers 80 outwardly and through engagement of the collar 81 on the plunger 80 with the shoulder 82 on the pipe support 67 it forces the pipe support to normal position carrying with the pipe support the train pipes 72, 75, and 76.

In the operation of this device, movement of the coupler 65 to one side of the normal or central position will cause the coupler, through its engagement with one of the plungers 80, to compress the spring 91 and force the plunger 80 inwardly, the plunger moving inwardly in the bracket arm until the coupler engages with the face of the bracket arm, whereupon, any further movement of the coupler to that side of its normal position will cause the coupler to carry with it the pipe support 67 and the train pipes secured thereto, further compressing the spring 91 until movement of the coupler and pipe support is stopped by the engagement of the pipe support with the inner face of one of the spaced members 51 or 52. Upon release of the pressure on the coupler 65 the spring 91 will force the coupler toward its normal or central position, shifting the plunger 80 in the bracket arm until the collar 81 engages with the shoulder 82 whereupon the spring 91 will return the pipe support 67 and the train pipes with the coupler 65 to the normal or central position, it being understood that the adjustment of the plungers 80 is such that they are both in engagement with the coupler 65 and the collars 81 are both in engagement with the shoulders 82 when the coupler 65 and pipe support 67 are in normal or central position. It will be noted that in the structure shown in Figs. 10 to 15, inclusive, as well as in the structure shown in Figs. 1 to 8, inclusive, that the coupler may have a limited movement to either side of its normal or central position without engaging with the pipe carrier or support, the free or independent movement of the coupler being designed to be sufficient for most of the usual movements of the coupler, the coupler engaging with the pipe carrier and shifting the train pipes only occasionally.

What is claimed is:

1. In a centering device for a transversely movable coupler, a carry iron extending beneath the coupler, a saddle for supporting the coupler and slidable longitudinally of said carry iron with the coupler, train pipe supporting means slidable along said carry iron, and yieldable means normally retaining the coupler and saddle centrally located with respect to the train pipe supporting means and the pipe supporting means centrally located with respect to the carry iron, the coupler and saddle having movement independent of the pipe supporting means for a portion of their extent of travel and having movement together with the pipe supporting means during the remainder of their extent of travel.

2. In a centering device for a transversely movable coupler, a carry iron extending beneath the coupler, a train pipe support slidable longitudinally upon the carry iron and normally disposed midway the length thereof, a coupler supporting saddle slidable longitudinally of the pipe support and carry iron and normally disposed midway the length of the pipe support, and means for yieldably retaining the pipe support and saddle in a normal position and permitting independent movement of the saddle for a portion of its path of travel and unitary movement of the saddle and pipe support for the remainder of the path of travel of the saddle.

3. A centering device for car couplers comprising a carry iron, a train pipe support resting upon said carry iron and slidable longitudinally thereon, a coupler saddle disposed intermediate the ends of said pipe support and slidable longitudinally of the carry iron and pipe support, said saddle having movement independent of the train pipe support for a portion of its path of travel and moving with the train pipe support during the remainder of its path of travel, and yieldable means normally retaining the pipe support centered with respect to the carry iron and the saddle centered with respect to the pipe support and carry iron.

4. A centering device for car couplers comprising a carry iron, a train pipe support resting upon said carry iron and slidable longitudinally thereon, the pipe support having upstanding end portions and means for securing pipes to the upstanding end portions, a coupler saddle disposed intermediate the upstanding end portions of said pipe support and slidable longitudinally of the carry iron and pipe support, said saddle having movement independent of the pipe support during a portion of its path of travel and the saddle and pipe support having unitary movement during the remainder of the path of travel of the saddle, and yieldable means normally retaining the pipe support centered upon the carry iron and the saddle centered with respect to the pipe support.

5. In a centering device for a transversely movable coupler, a carry iron, a pipe support carried by and slidable longitudinally upon said carry iron and having upstanding end portions and means for securing pipes to the upstanding end portions, a coupler carrying saddle slidable between the upstanding end portions of said pipe support, and yieldable means normally retaining the saddle and a coupler carried thereby centrally located between the upstanding end portions of the pipe support and the pipe support centrally located with respect to the carry iron.

6. In a centering device for a transversely movable coupler, a carry iron, a pipe support carried by and slidable longitudinally upon said carry iron and having upstanding portions and means for securing pipes to the upstanding portions, a coupler carrying saddle slidable between the upstanding portions of said pipe support, and yieldable means for normally retaining the saddle centered with respect to the pipe support and the pipe support centered with respect to the carry iron.

7. In a centering device for a transversely movable coupler, a carry iron, a pipe support carried by and slidable longitudinally upon said carry iron, a coupler carrying saddle slidable on said carry iron, and yieldable centering means for said saddle and pipe support, said centering means being carried by said carry iron and placed under compression when the saddle and a coupler carried thereby are moved longitudinally of the pipe support, the pipe support having movement with the saddle during a portion of the movement of the saddle, and said yieldable means being engageable with the pipe support to return the pipe support to its normal position.

8. In a centering device for a transversely movable coupler, a carry iron, a pipe support resting upon and slidable longitudinally of said carry iron, a coupler carrying saddle slidable longitudinally of said pipe support, the pipe support having openings intermediate its length and the saddle having abutments at its ends, and yieldable centering means mounted for movement longitudinally of said carry iron and extending through the openings of said pipe support and engaging the abutments of the saddle, said centering means normally centering the saddle with respect to the pipe support and carry iron and through engagement with the pipe support at the ends of the openings imparting movement thereto and normally centering the pipe support relative to the carry iron.

9. In a centering device for a transversely movable coupler, a carry iron, a pipe support resting upon and slidable longitudinally of said carry iron, a coupler carrying saddle slidable longitudinally of said pipe support, the pipe support having openings intermediate its length and the saddle having abutments at its ends, and yieldable means slidably carried by said carry iron for movement longitudinally thereof and projecting through the openings for engagement with the abutments of said saddle and the pipe support at the ends of the openings, said yieldable means normally centering the pipe support with respect to the carry iron and the saddle with respect to the pipe support.

10. In a centering device for a coupler adapted to be mounted for transverse movement, a carry iron, a pipe support resting upon and slidable longitudinally of said carry iron, a coupler carrying saddle slidable longitudinally upon said pipe support, the pipe support having passages intermediate its length and the saddle having abutments at its ends, a rod carried by and extending longitudinally of said carry iron, followers slidable upon said rod and having fingers extending upwardly through the passages of said pipe support for engaging the abutments of said saddle, and a spring upon said rod between the followers urging the followers away from each other and through engagement of the fingers with the abutments of the saddle and the pipe support at the ends of the passages retaining the saddle and pipe support in a normal position.

11. A centering device for car couplers comprising a carry iron, a train pipe support resting upon said carry iron and slidable longitudinally thereon, a coupler saddle resting upon said carry iron intermediate the length of said train pipe support and slidable longitudinally upon said carry iron, said saddle having movement independent of the train pipe support for a portion of its path of travel and having movement with the train pipe support during the remainder of its path of travel, and means for yieldably retaining the saddle and train pipe support in a normal position.

12. A centering device for car couplers comprising a carry iron, a train pipe support resting upon said carry iron and slidable longitudinally thereon, a coupler saddle resting upon said carry iron intermediate the length of said train pipe support and slidable longitudinally upon said carry iron, the train pipe support having upstanding portions disposed upon opposite sides of said saddle, the saddle having a limited movement between said upstanding end portions independent of the pipe support and a movement with the train pipe support, and means yieldably retaining the train pipe support and saddle in a normal position with the train pipe support disposed intermediate the length of said carry iron and the saddle intermediate the upstanding portions of the train pipe support.

13. A centering device for car couplers comprising a carry iron, a train pipe support resting upon said carry iron and slidable longitudinally thereof and having upstanding end portions and means for securing train pipes to the upstanding end portions, a coupler saddle resting upon the carry iron between the upstanding end portions of said train pipe support and slidable longitudinally of the carry iron, said saddle having a limited movement independent of said pipe support and a movement with the pipe support, and yieldable means normally retaining the pipe support and the saddle centered with respect to the carry iron.

14. A centering device for car couplers comprising a carry iron, a train pipe support resting upon said carry iron and slidable longitudinally thereof, a coupler saddle resting upon the carry iron and slidable longitudinally thereof and imparting movement to the pipe support, said saddle having a limited movement independent of said pipe support and a movement with the pipe support, and yieldable means for normally retaining the pipe support centered with respect to the carry iron, and for yieldably retaining the saddle centered on the carry iron.

15. A centering device for car couplers comprising a carry iron, a train pipe support resting upon said carry iron and slidable longitudinally thereof and having upstanding end portions and means for securing train pipes to the upstanding end portions, a coupler saddle resting upon the carry iron and moved longitudinally thereof by the coupler, the coupler also imparting movement to the pipe support and said saddle having a limited movement independent of the pipe support, and resilient means normally holding the pipe support and the saddle centered with respect to the carry iron.

16. A centering device for car couplers comprising a carry iron, a train pipe support resting upon said carry iron and slidable longitudinally thereof, a coupler saddle moved by the coupler longitudinally of the pipe support, said coupler also imparting movement to the pipe support, and said saddle having a limited movement independent of the pipe support, and resilient means exerting a force tending to hold the pipe support and the saddle centered with respect to the carry iron.

17. In a centering device for a coupler, a slidably mounted saddle for carrying the coupler, a slidably mounted train pipe supporting means having a limited movement with the coupler, means for exerting a force tending to hold the pipe supporting means and saddle in a central position, and means for insuring a limited movement of the saddle by the coupler from the central position prior to any movement of the supporting means by the coupler.

18. In a centering device for a coupler, a slidably mounted saddle for carrying the coupler, with a slidably mounted train pipe supporting means movable with the coupler, a carry iron for supporting and guiding the saddle and train pipe supporting means, means beneath the guide means of said carry iron for exerting a force tending to hold the supporting means and the saddle in a central position and means for insuring a limited movement of the saddle by the coupler from the central position prior to any movement of the supporting means by the coupler.

In witness whereof I have hereunto set my hand.

VICTOR WILLOUGHBY.